United States Patent

Abali et al.

[11] Patent Number: 6,031,835
[45] Date of Patent: Feb. 29, 2000

[54] METHOD FOR DEADLOCK FREE AND AND RELIABLE ROUTING IN A PACKET SWITCHED NETWORK

[75] Inventors: Bulent Abali, New York; Kevin John Reilly, Mahopac, both of N.Y.; Craig Brian Stunkel, Bethel, Conn.

[73] Assignee: International Business Machines Corporation, Armonk, N.Y.

[21] Appl. No.: 08/833,174

[22] Filed: Apr. 4, 1997

[51] Int. Cl.[7] .................................... H04Q 11/04
[52] U.S. Cl. .................. 370/388; 370/400; 370/447; 370/462; 395/200.31; 395/200.73
[58] Field of Search ..................... 370/351, 386, 370/387, 388, 389, 392, 400, 413, 422, 427, 447, 462; 395/200.3, 200.31, 200.73

[56] References Cited

U.S. PATENT DOCUMENTS

| | | | |
|---|---|---|---|
| 4,763,247 | 8/1988 | Borovski et al. | 364/200 |
| 4,766,534 | 8/1988 | DeBenedictis | 364/200 |
| 4,893,303 | 1/1990 | Nakamura | 370/60 |
| 5,157,692 | 10/1992 | Horie et al. | 375/38 |
| 5,189,668 | 2/1993 | Takatori et al. | 370/60 |
| 5,224,100 | 6/1993 | Lee et al. | 370/94.3 |
| 5,260,934 | 11/1993 | Tanaka et al. | 370/54 |
| 5,453,978 | 9/1995 | Sethu et al. | 370/60 |
| 5,805,589 | 9/1998 | Hochschild et al. | 370/389 |
| 5,812,549 | 9/1998 | Sethu | 370/389 |
| 5,838,684 | 11/1998 | Wicki et al. | 370/422 |
| 5,892,923 | 4/1999 | Yasuda et al. | 370/392 |

*Primary Examiner*—Douglas W. Olms
*Assistant Examiner*—Shick Hom
*Attorney, Agent, or Firm*—F. Chau & Associates, LLP

[57] ABSTRACT

A method for substantially preventing routing deadlocks and reliably routing service messages in a network comprised of successive stages of cross-point switches which collectively interconnect a plurality of nodes external to the network, wherein at least one service message is carried between one of the nodes and one of the cross-point switches over a route through the network, including the steps of defining a plurality of routes through the network such that at least one service message can be carried from individual nodes within the plurality of nodes over different corresponding ones of the routes to every cross-point switch within the network, wherein each of the defined routes extends over at least one link; duplicating a message to be routed through the network; and imposing routing restrictions on at least one of the cross-point switches in the network.

19 Claims, 11 Drawing Sheets

METHOD FOR DEADLOCK FREE AND AND RELIABLE ROUTING IN A PACKET SWITCHED NETWORK

BACKGROUND OF THE INVENTION

1. Field of the Invention

The present invention relates to methods for deadlock free and reliable routing of messages in a network of cross-point switches. More specifically, the present invention is particularly useful in a parallel computer system consisting of a large number of processors interconnected by a network of cross-point switches.

2. Description of the Related Art

With the continual evolution and commercial availability of increasingly powerful, sophisticated and relatively inexpensive microprocessors, massively parallel processing appears as an increasingly attractive vehicle for handling a wide spectrum of applications, such as, e.g., involving transaction processing, simulation and structural analysis, heretofore processed through conventional mainframe computers.

In a massively parallel processing system, a relatively large number, often in the hundreds or even thousands, of separate, though relatively simple, microprocessor based processing elements is inter-connected through a communications fabric generally formed of a high speed packet network in which each such processing element appears as a separate port on the network. The fabric routes messages, in the form of packets, from any one of these processing elements to any other to provide communication therebetween. Each of these processing elements typically contains a separate microprocessor and its associated support circuitry, the latter being typified by, inter alia, random access memory (RAM) and read only memory (ROM), for temporary and permanent storage, respectively, and input/output (I/O) circuitry. In addition, such processing element also contains a communication sub-system, formed of an appropriate communications interface and other hardware as well as controlling software, that collectively serves to interface that element to the packet network.

Generally, the overall performance of massively parallel processing systems is heavily constrained by the performance of the underlying packet network used therein. In that regard, if the packet network is too slow and particularly to the point of adversely affecting overall system throughput, the resulting degradation may sharply and disadvantageously reduce the attractiveness of using a massively parallel processing system in a given application.

Specifically, in a massively parallel processing system, each processing element executes a pre-defined granular portion of an application. In executing its corresponding application portion, each element generally requires data from, e.g., an application portion executing on a different element and supplies resulting processed data to, e.g., another application portion executing on yet another processing element. Owing to the interdependent nature of the processing among all the elements, each processing element must be able to transfer data to another such element as required by the application portions then executing at each of these elements. Generally, if the processing element, i.e., a "destination" element, requests data from another such element, i.e., a "source" or "originating" element, the destination element remains idle, at least for this particular application portion, until that element receives a packet(s) containing the needed data transmitted by the source element, at which point the destination element once again commences processing this application portion. Not surprisingly, a finite amount of time is required to transport, through the packet network, a packet containing the request from the destination to the source processing elements and, in an opposite direction, a responding packet(s) containing the requested data. This time unavoidably injects a degree of latency into that application portion executing at the destination element. Since most processing elements in the system function as destination elements for application portions executing at corresponding source elements, then, if this communication induced latency is too long, system throughput may noticeably diminish. This, in turn, will significantly and disadvantageously degrade overall system performance. To avoid this, the packet network needs to transport each packet between any two communicating processing elements as quickly as possible in order to reduce this latency. Moreover, given the substantial number of processing elements that is generally used within a typical massively parallel processing system and the concomitant need for any one element in this system to communicate at any one time with any other such element, the network must be able to simultaneously route a relatively large number, i.e., an anticipated peak load, of packets among the processing elements.

Although widely varying forms of packet networks currently exist in the art, one common architecture uses a multi-stage inter-connected arrangement of relatively small cross-point switches, with each switch typically being an 8-port bi-directional router in which all the ports are internally inter-connected through a cross-point matrix.

For example, FIG. 1 illustrates a switch board 100 typically used in current parallel processing systems. Current parallel processing systems comprise up to 512 nodes and at least one switch board interconnecting the processors. Switch board 100 includes eight cross-point switches $102_0$–$102_7$. Preferably the eight cross-point switches $102_0$–$102_7$ are configured to be four-by-four bidirectional cross-point switches having four internal and four external bidirectional ports $106_0$–$106_7$. Internal ports are designated with numerals four, five, six and seven. External ports are designated with numerals zero, one, two and three. Each link 104 interconnecting a pair of cross-point switches $102_0$–$102_7$, is preferably a full duplex bidirectional link, allowing simultaneous message transmission in both directions, i.e., to and from each cross-point switch 102. The aggregate of links 104 form a connection matrix 105. The eight cross-point switches $102_0$–$102_7$ and the connection matrix 105 collectively comprise a single switch board.

FIG. 2 illustrates a 512 processor system having node switch boards $108_0$–$108_{31}$ and intermediate switch boards $114_0$–$114_{15}$. Node switch boards $108_0$–$108_{31}$ comprise electrical structure to connect to sixteen processors or nodes on an external side 110 of the node switch boards $108_0$–$108_{31}$ and similar electrical structure to connect to other switch boards on an internal side 112. Processors are commonly also referred to as nodes. Intermediate switch boards $114_0$–$114_{15}$ are generally found on large parallel processing systems such as the systems shown in FIG. 2. Intermediate switch boards $114_0$–$114_{15}$ are named as such since they do not directly connect to processors, rather they are configured to interconnect a plurality of node switch boards. Intermediate switch boards $114_0$–$114_{15}$ are each shown having electrical structure to connect to a maximum of sixteen node switch boards on a first side 115 and a maximum of sixteen node switch boards on a second side 117. Links 104 interconnect the node switch boards $108_0$–$108_{31}$ with intermediate switch boards $114_0$–$114_{15}$. FIG. 2, therefore, illustrates a 512 node system that comprises thirty-two node switch boards $108_0$–$108_{31}$, also designated as NSB0 through NSB31, and sixteen intermediate switch boards $114_0$–$114_{15}$, also designated as ISB0 through ISB15. The quantity of nodes a system is capable of accommodating is determined by multiplying the number of node switch boards $108_0$–$108_{31}$ by the number of ports 106 on the external sides 110 of each node switch board. In the embodiment shown in FIG. 2, the thirty two node switch boards $108_0$–$108_{31}$, each having sixteen external ports 106, define a (32×16=512) 512 node system.

While such a bi-directional multi-stage packet-switched network is relatively simple, as compared to other packet-switched network topologies, and offers high transmission bandwidth among all its ports, unfortunately this type of network is susceptible to routing deadlocks. These deadlocks, while occurring somewhat infrequently, arise because multiple routes exist between any two given switches.

Routes have traditionally been defined without considering any potential for routing deadlocks. Hence, a routing deadlock can occur whenever corresponding packets, each situated in, e.g., the central queue within a group of different switch chips, are waiting to be simultaneously routed over common paths that connect pairs of switch chips in successive stages. When such a condition occurs, each of these switch chips essentially waits for the others in the group to route their packets over these particular paths. Because none of the packets for this group is able to transmit through its associated central queue until any one of the packets for this group is routed, all these packets simply wait and the corresponding paths become deadlocked with no resulting traffic flow thereover. As a result, while the deadlock occurs, the processing elements, to which these packets are destined, also continue to wait for these packets which, in turn, halts their processing throughput. Consequently, the bandwidth of the network skews to favor only those remaining processing elements unaffected by the deadlock which, in turn, can severely imbalance the processing workload and significantly diminish system throughput.

In FIG. 3, a typical highway example is utilized to illustrate a deadlock of service messages by analogy. A highway is shown with one lane in either of the northbound and southbound directions, wherein a northbound vehicle 124 wants to make a left turn onto side street 125 and is required to wait for the southbound lane of traffic to clear, thereby causing all northbound traffic behind vehicle 124 to stop. Likewise, a southbound vehicle 126 wants to make a left turn onto side street 127 and is required to wait for the northbound lane of traffic to clear, thereby causing all southbound traffic behind vehicle 126 to stop. Now, since both lanes are blocked, neither of the two vehicles can make a left turn. The net result is a deadlock condition wherein all traffic comes to a stop and no vehicle can move forward. Consistent with an objective of this invention, the deadlock condition may have been prevented here by a routing restriction, e.g., a "NO LEFT TURN" sign in at least one of the intersections. If the NO LEFT TURN sign existed, then either vehicle 124 or 126 would not have stopped. Therefore, eventually, either the northbound or southbound traffic would clear and allow the other lane to proceed.

Faced with the problem of avoiding deadlocks, one skilled in the art might first think that some type of global arbitration technique could be used to anticipate a routing deadlock and, in the event, one is expected to select one of a number of non-deadlockable paths over which a packet can be transmitted and thus avoid the deadlock. This technique would require that all packets that are to transmit through all the central queues be monitored to detect a potential routing deadlock and then arbitrated accordingly. Unfortunately, the circuitry to accomplish these functions would likely be quite complex and would also need to be located external to all the switch circuits but connected to each of them. This, in turn, increases the size, complexity and hence cost of the packet-switched network. As such, this technique would be quite impractical.

Given this, one might then turn to an alternate technique that involves forming the packet network with duplicated switch boards. By isolating packets that only flow in one switch board from potentially interacting with packets that simultaneously flow only in the other switch board, this technique does eliminate deadlocks. Furthermore, this technique does not degrade transmission bandwidth. Unfortunately, by requiring duplicate switch boards and associated circuitry, this technique is costly.

Finally, one might consider use of a technique that avoids routing deadlocks by simply prohibiting certain routes from being used. Through this particular technique, only a specific sub-set of all the routes between two switch chips in the same stage would be defined as being available to carry packet traffic therebetween and thus included within the route tables. Once chosen, these routes would not change, except for again maintenance or failure conditions. The routes that form the sub-set would be specifically chosen such that routing deadlocks would not occur. Inasmuch as network bandwidth degrades as each additional route is prohibited, a goal in using this technique is to prohibit as few routes as possible.

Since the technique of prohibiting routes merely requires selecting certain entries to include in the route table for each processing element, this technique is very simple and highly cost-effective to implement. Thus, this technique would be readily favored for inclusion in a multi-stage cross-point packet network but for its inability to create a symmetric bandwidth reduction across the entire network.

In a variation of the above routing schemes, U.S. Pat. No. 5,453,978 to Sethu et al. discloses a method of establishing deadlock-free routing of data messages in a parallel processing system.

Another problem associated with large parallel processing systems concerns outages of links and/or switches within the network which adversely affect the reliability of the system. An outage of a link or switch will prevent the transmission of a packet over its intended route.

Thus, a need exists in the art for a practical technique that prevents deadlocks from occurring in a large scale bi-directional multi-stage inter-connected cross-point switching network, and particularly, though not exclusively, for use in large scale massively parallel processing systems. Such a technique should not completely prohibit certain routes or sections of the network from transmitting messages. A further need exists for a technique that will provide deadlock-free routing with increased reliability.

SUMMARY OF THE INVENTION

The presently disclosed methods overcome these and other disadvantages of the prior art. In a network comprised of successive stages of cross-point switches which collectively interconnect a plurality of nodes external to the network, wherein at least one service message is carried between one of the nodes and one of the cross-point switches over a route through the network, an object of the present invention is to provide a method for substantially preventing routing deadlocks from occurring in the network and reliably routing service messages therein. The method comprises the steps of defining a plurality of routes through the network such that at least one service message can be carried from individual nodes within the plurality of nodes over different corresponding ones of the routes to every cross-point switch within the network, wherein each of the defined routes extends over at least one link; duplicating a message to be routed through the network; and imposing routing restrictions on at least one of the cross-point switches in the network. The routing restrictions imposed on the cross-point switches in the network include no-internal-turn restrictions and no-external-turn restrictions.

In a preferred embodiment of the present invention, the cross-point switches which are directly connected to a plurality of nodes external to the network are defined as node switchboard switches and at least one of the node switchboard switches is defined as a pivot switch. The node switchboard switch defined as a pivot switch may be advantageously located a greatest number of stages of switches removed from one of the plurality of nodes external to the network. Wherein the node switchboard switches include a plurality of input and output ports, at least one of the routing and pivoting restrictions may be limited to at least one of the plurality of input and output ports. In other embodiments of the present invention, the method may further comprise the step of manually defining at least one node switchboard switch as a pivot switch by a network administrator, or the step of automatically defining at least one of the node switchboard switches as a pivot switch.

The method in accordance with the present invention is advantageously used in large parallel processing systems wherein each of the nodes comprises a separate processing element. The method in accordance with the present invention may be used in a parallel processing system comprising about 512 separate processing elements and switches which are organized into about 32-port switchboards. The system may further comprise a plurality of switchboards wherein about 32 of the switchboards are node switchboards and about 16 of the switchboards are intermediate switchboards, wherein the intermediate switchboards collectively interconnect all of the node switchboards such that a corresponding one of about 16 ports on each of the node switchboards is connected, through a different corresponding link, to the same corresponding port on each one of the node switchboards and the remaining about 16 ports on each of the node switchboards are connected to about 16 different successive ones of the processing elements.

In yet another embodiment of the present invention, a method for substantially preventing routing deadlocks from occurring and reliably routing service messages in an apparatus having a network comprised of successive stages of cross-point switches which collectively interconnect a plurality of nodes external to the network, wherein at least one service message is carried between one of the nodes and one of the cross-point switches over a route through the network, and at least one service message comprises a primary service message and a secondary service message, is disclosed. The method includes the steps of defining a plurality of routes through the network such that a packet can be carried from individual nodes within the plurality of nodes over different corresponding ones of the routes to every cross-point switch within the network, wherein each of the defined routes extends over at least one link; determining a first route traversing a minimum number of links and cross-point switches between one of the cross-point switches, requiring a service, and a corresponding service processor; marking all switches traversed by the first route with a do-not-use message; determining a second route traversing a minimum number of links and cross-point switches, between the cross-point switch requiring service and the corresponding service processor, which does not traverse any of the switches marked with the do-not-use message; and writing the first and second routes to a routing table.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF THE PREFERRED EMBODIMENTS

To enhance reader understanding, we will first discuss various aspects of packet routing in a parallel processing system and particularly pertaining to a bi-directional cross-point based packet network used therein, then proceed to illustrate a typical routing deadlock situation and finally describe, in detail, our present invention which advantageously prevents these deadlock from occurring and provides for reliable routing.

Figure 1:
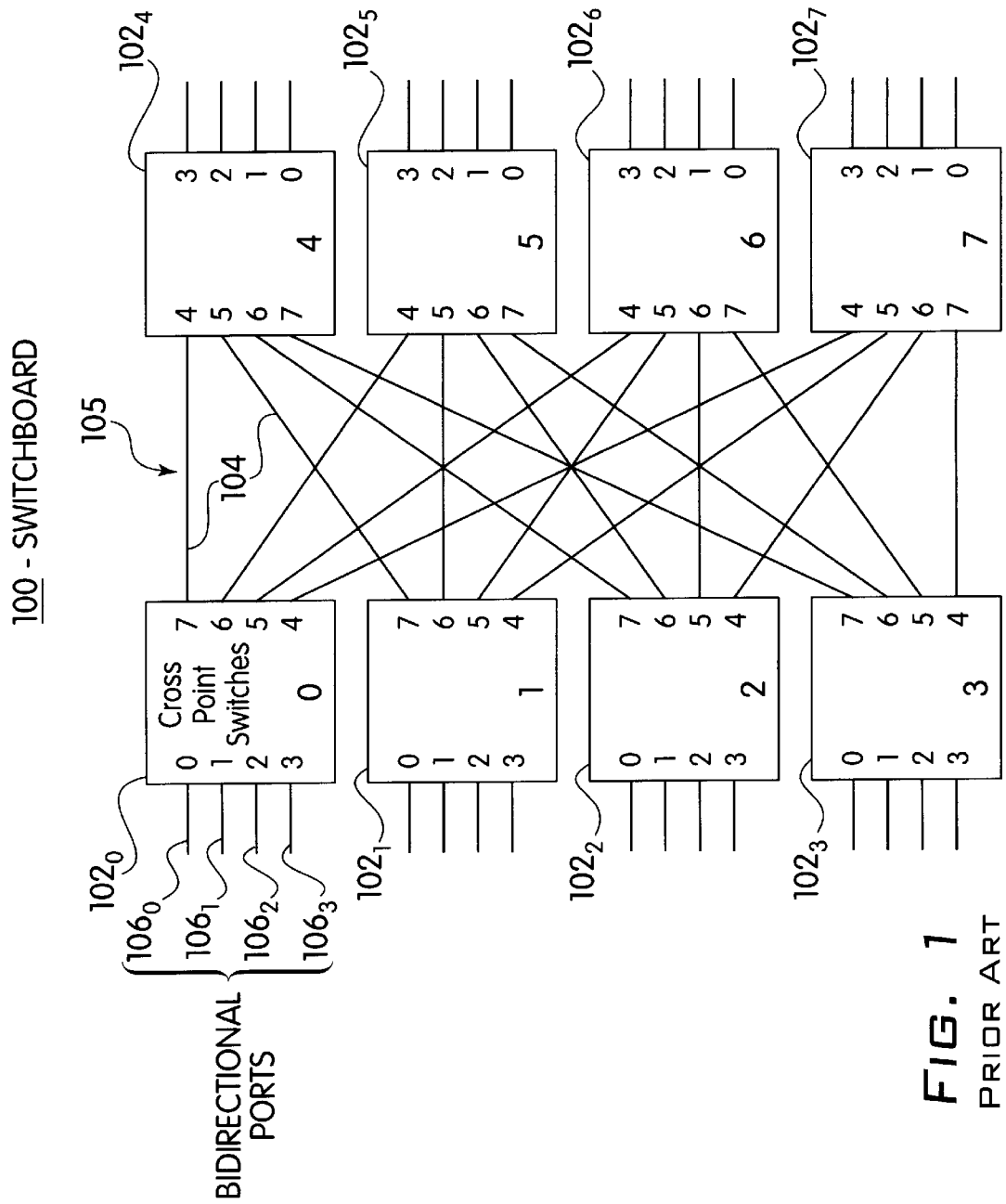
FIG. 1 is a schematic representation of a prior art switch board topology.
Figure 2:
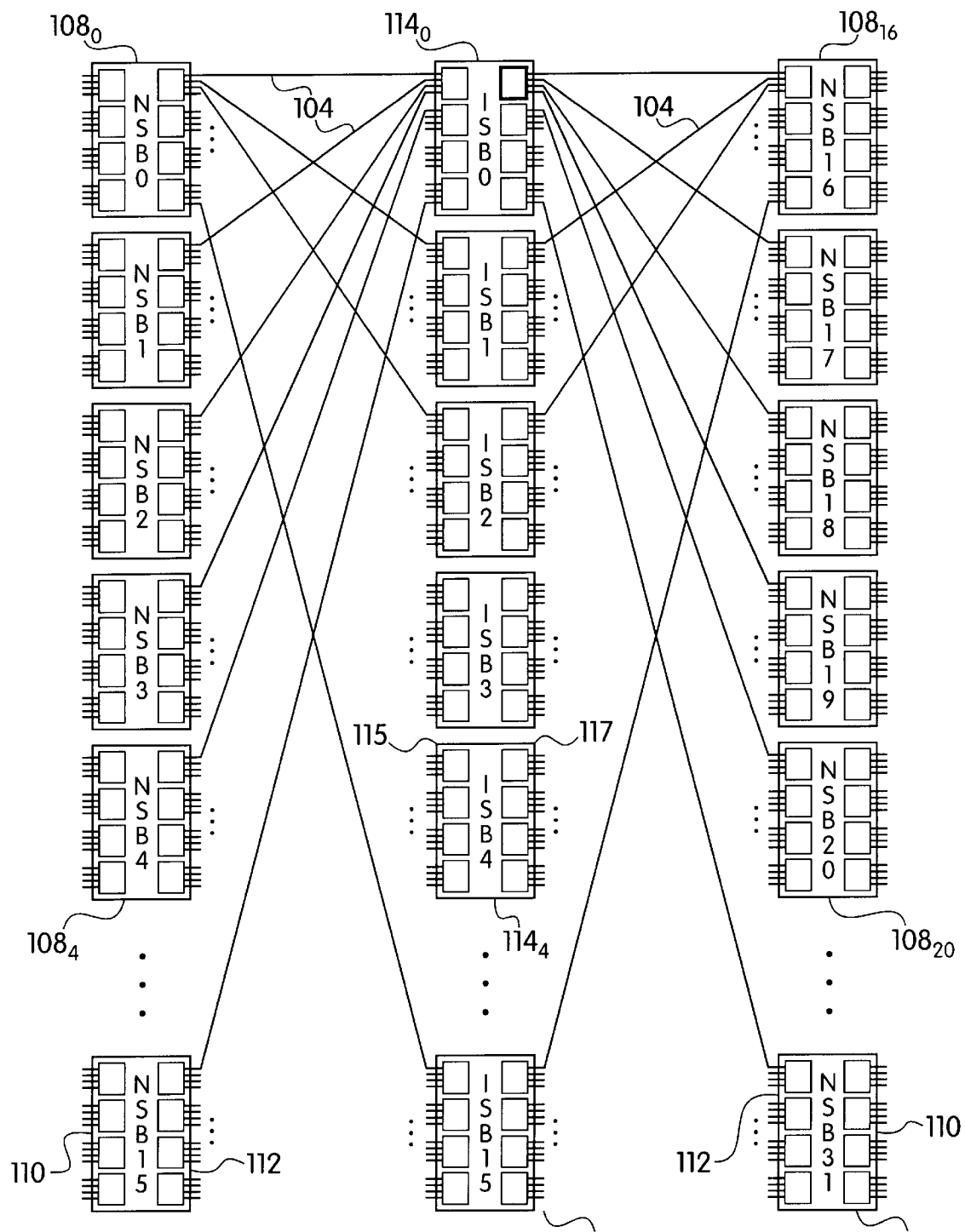
FIG. 2 is a block diagram of a prior art 512 processor node network.
Figure 3:
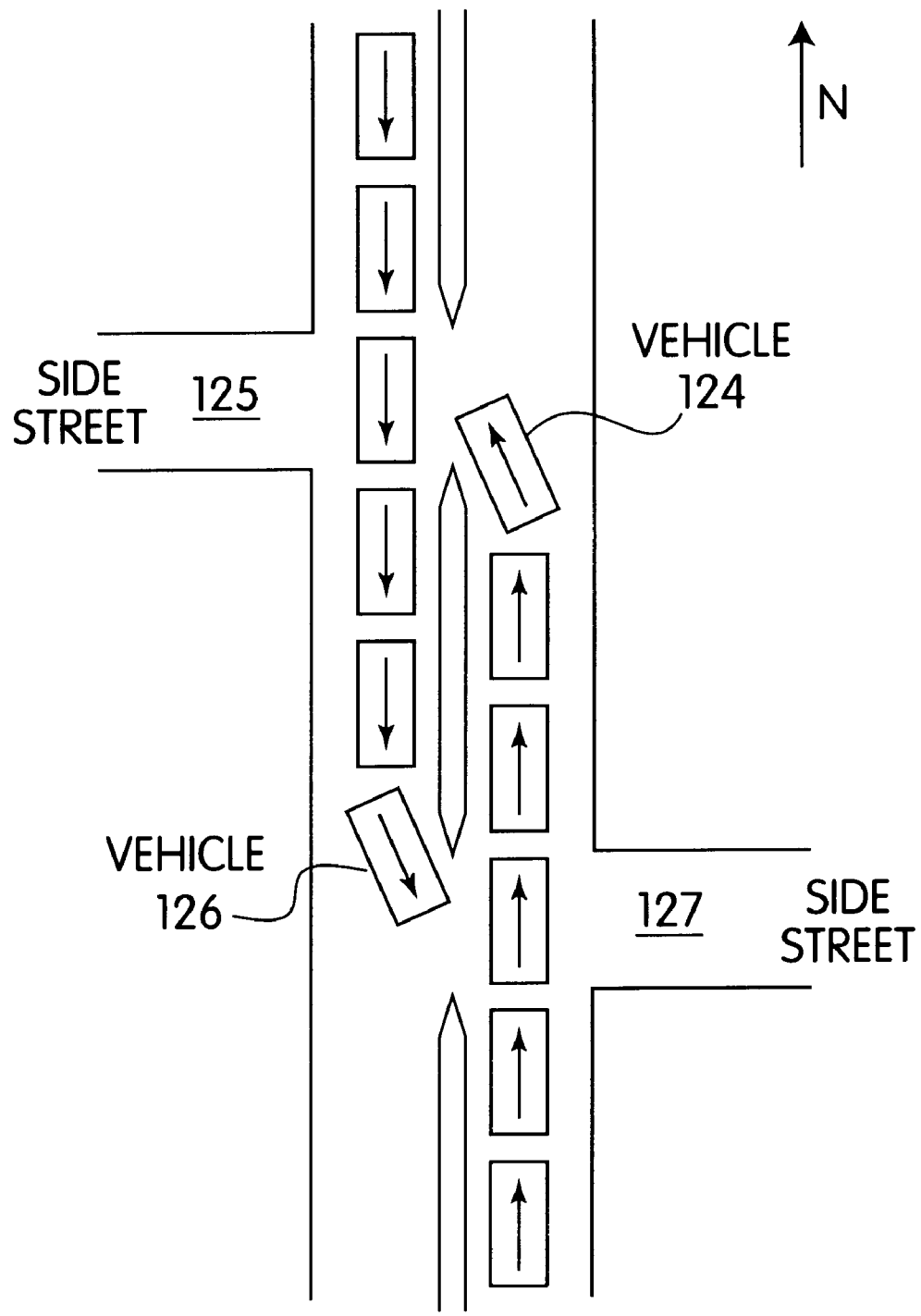
FIG. 3 is a block diagram illustrating a deadlock of service messages by analogy.
Figure 4:
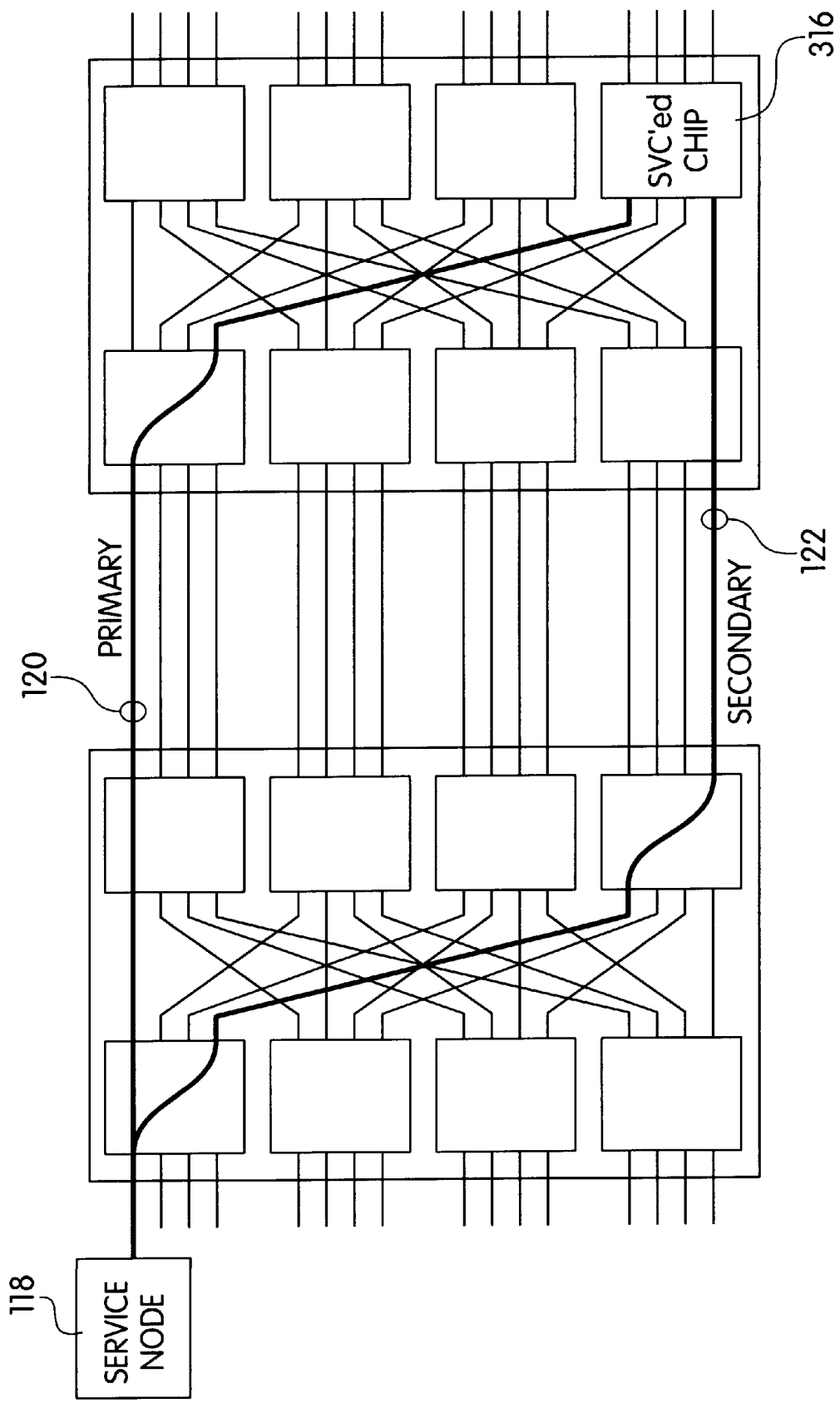
FIG. 4 is a schematic representation illustrating disjoint routes taken by primary and secondary service messages.

Referring now to the drawings in detail, FIG. 4 illustrates the routes taken by a primary service message 120 and secondary service message 122 between a switch chip 316 and a service processor 118. Service messages are commonly used in parallel computer systems to alert the system to the need for recovery of errors associated with various switches and processors within the system. In accordance with the present invention, to reliably transmit information between a switch chip 316 and a service processor 118, a pair of messages, called the primary service message 120 and the secondary service message 122, is used. Another embodiment of the present invention is shown, wherein it is desirable to route the primary and secondary service messages 120 and 122 disjointly, i.e., the two routes must have a minimum number of switches and links shared in their route so that no single point of network failure stops the transmission of both messages, and therefore at least one of the two messages is likely to arrive at its destination in the event of a switch or link failure. If the service processor 118 receives at least one of the two identical service messages, then switch operations and error recovery will proceed without a loss of information. However, since additional traffic is a consequence of the disjoint routing requirement, it may cause the network to deadlock if routes are not chosen carefully. As will be discussed in detail below, a further object of this invention is to provide deadlock free and reliable service routes within bidirectional multistage networks such as the parallel processing network.

Figure 5:
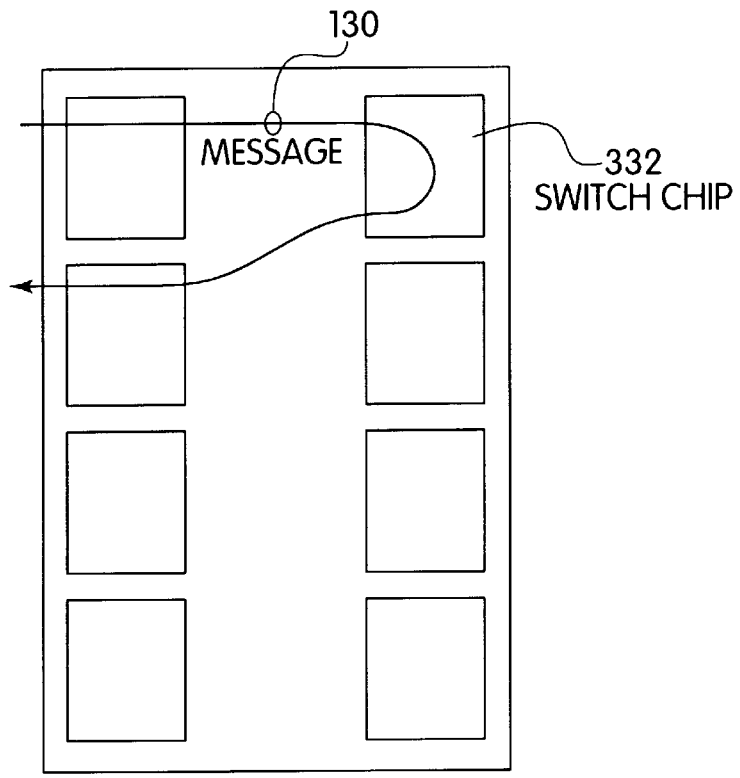
FIG. 5 is a schematic representation of a switch board illustrating turnaround routing.

FIG. 5 illustrates a bidirectional multistage network, such as IBM's SP2 network, which allows for turns within a switch chip. As shown, a message 130 entering a switch chip 382 from one side may turn around and leave the switch chip from the same side.

Figure 6:
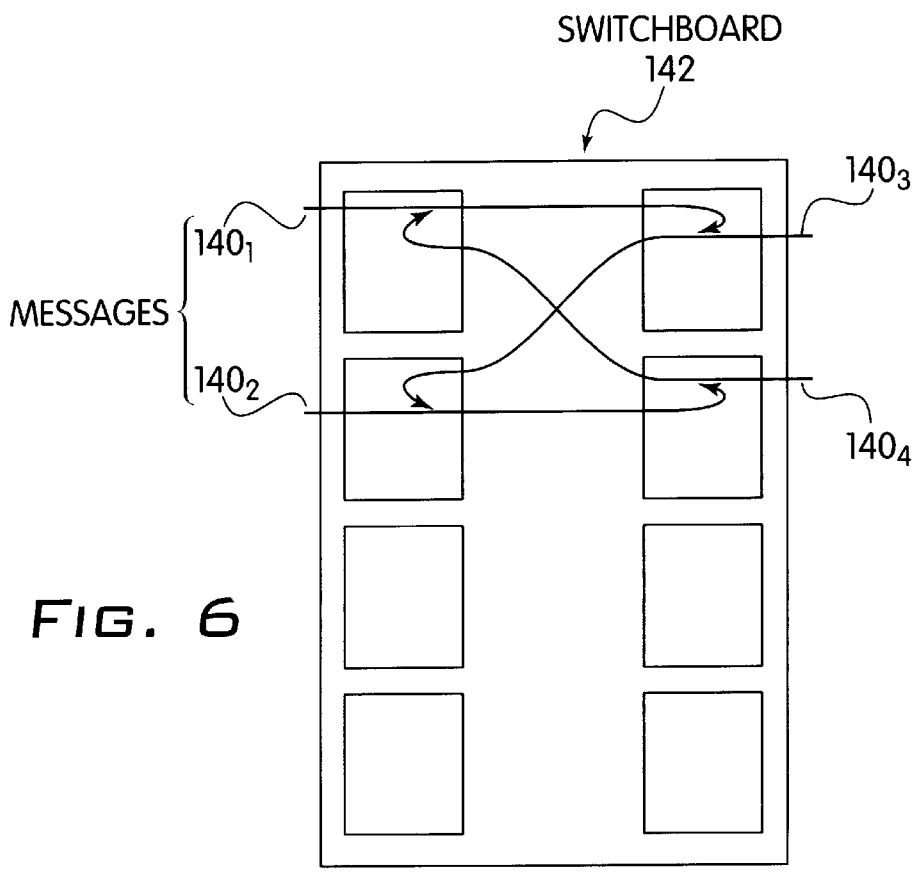
FIG. 6 is a schematic representation of a switch board illustrating a deadlock cycle of four messages, each indicated by an arrow.

Typical SP networks in the prior art also allow the entire length of a message to span several switches in a worm-hole fashion, also referred to as cut-through routing. In such networks, there is a possibility of a deadlock if all switch chips allow messages to internally turn around without any turn restriction. For example, assume that four messages $140_1$–$140_4$ enter the switch board 142 simultaneously, as shown in FIG. 6. Each message 140 will occupy an output port. The leading head portion of each message 140 will continue to the next switch down-stream, however, while attempting to turn around, each message will find its destination output port blocked by another message. Without specific directions, the messages will not retreat, they will wait for the blocked output port to become available. The result is a deadlock condition, in which the four messages $140_1$–$140_4$ will wait indefinitely. Obviously, a deadlock condition is detrimental to a network's operation because a number of links and switch input and output ports are permanently occupied by the deadlocked data messages. Eventually, additional messages will attempt to access these ports and will also become deadlocked.

The deadlock in FIG. 6, in graph theoretic terms, is a cycle of directed edges where no outgoing edge in the cycle exists. A cycle is a contiguous sequence of input and output ports in the network, where the first and the last ports are the same port. Deadlocks may be avoided by preventing cycles to exist in the network.

The presence of cycles in the network may be detected by the well known depth-first search algorithm. When utilizing this technique, the network is represented by a graph where graph vertices represent the switch input and output ports and graph edges represent the links between pairs of switch ports and possible connections between ports within the switches. Starting with any switch port, and then exhaustively searching the entire network in depth-first fashion, a cycle will be detected, if any exist, wherein the first port is the same as the last port.

Figure 9:
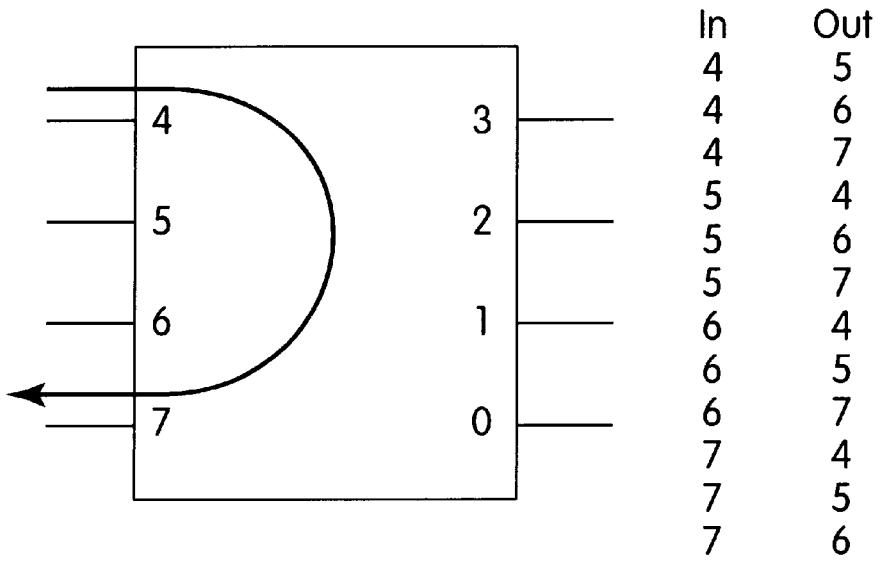
FIG. 9 is a block diagram illustrating an internal turn on a switch.
Figure 10:
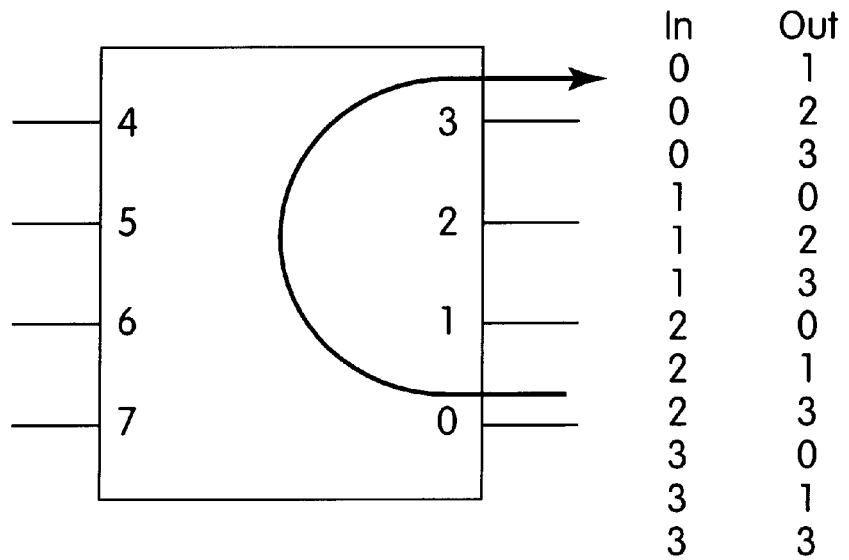
FIG. 10 is a block diagram illustrating an external turn on a switch.

In typical networks, data message routes may create deadlock cycles in intermediate switch boards (ISB's), since messages may turn around from both the left and right sides of the ISB's. To prevent deadlock cycles, messages are restricted to not turn around on a selected set of switches. Data message routing restrictions are described, for example, in U.S. Pat. No. 5,453,978 to Sethu et al. While determining routes between processors, during the route table generation phase of network start-up, some switch chips are labelled with no-internal-turn (NIT) or no-external-turn (NET) restrictions. The restrictions are analogous to the "NO TURN" signs in the highway analogy. Also discussed above, the restrictions indicate that the routing tables may not have any routes that turn around in a particular direction from a given switch. As discussed above, the term "internal" refers to the internal ports (4–7) of the switch and the term "external" refers to the external ports (0–3). Examples of internal and external turns are shown in FIG. 9 and FIG. 10, respectively. The NIT restriction states that internal turns, i.e., entering from one of the internal ports 4 through 7 and then exiting from one of the internal ports 4 through 7, is not permitted. The NET restriction states that external turns, i.e., entering from one of ports 0 through 3 and then exiting from one of ports 0 through 3, is not permitted. Routing restrictions are strategically placed on the switches so that no deadlock cycle can exist in the network. For example, in FIG. 7, the switches $150_0$–$150_3$ on the left side of switch board 152 all have NIT routing restrictions. These routing restrictions are imposed to prevent a deadlock cycle from being created within the switch board. Unlike the deadlock cycle created in FIG. 6, the messages $154_1$–$154_4$ in FIG. 7 will not be caught in a deadlock cycle, due to the NIT routing restrictions. Messages $154_1$–$154_4$ traverse switches $150_0$–$150_1$ and attempt to make internal turns within switches $150_4$ and $150_5$. Messages $154_3$ and $154_4$ traverse switches $150_4$ and $150_5$ and proceed directly through switches $150_1$ and $150_0$. Although initially it seems that the output ports for messages $154_1$ and $154_2$ are blocked within switches $150_4$ and $150_5$ by messages $154_3$ and $154_4$, the no-internal-turn restrictions placed on switches $150_0$ and $150_1$ permit messages $154_3$ and $154_4$ to proceed which will eventually clear the way for messages $154_1$ and $154_2$ to make the internal turns within switches $150_4$ and $150_5$.

Figure 7:
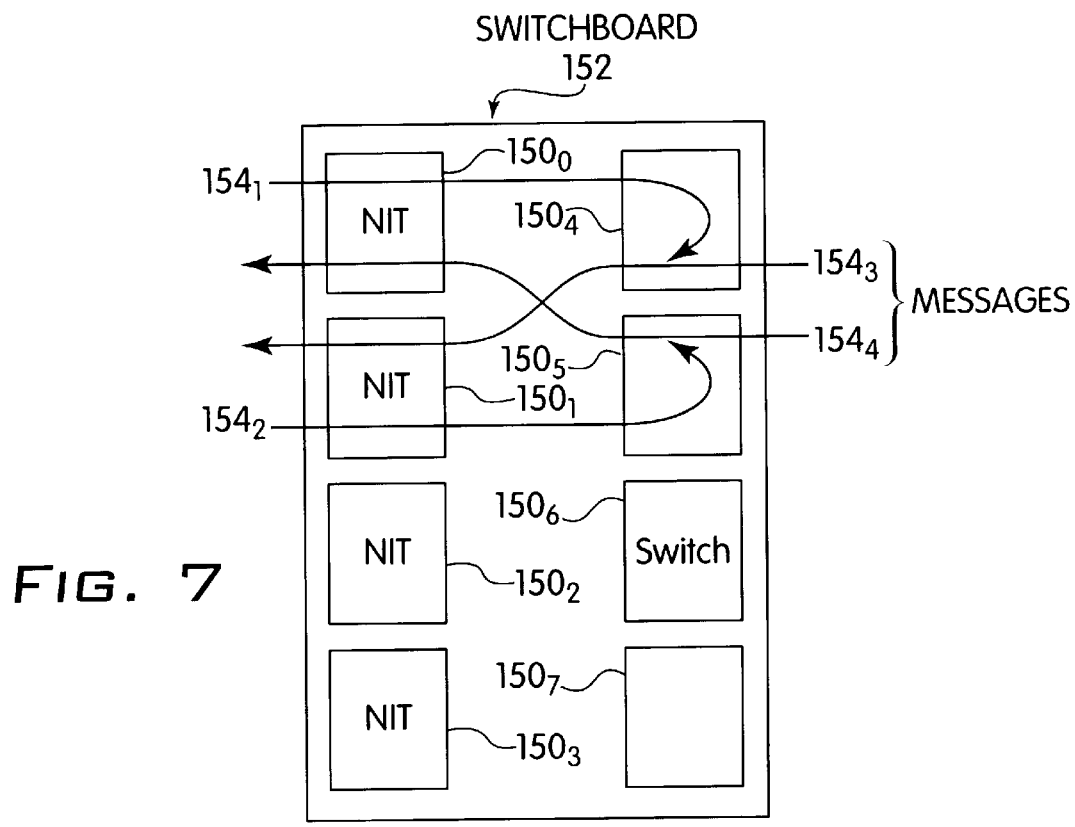
FIG. 7 is a schematic representation of a switch board illustrating no-internal-turn restricted switches.
Figure 8:
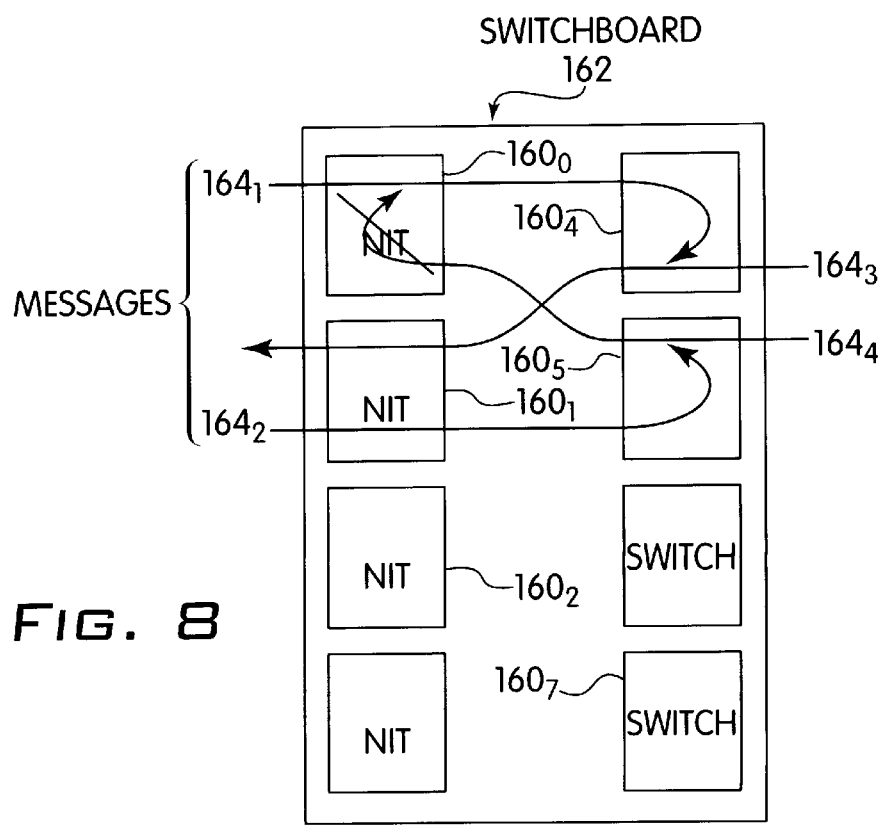
FIG. 8 is a schematic representation illustrating the switch board of FIG. 7 with one no-internal-turn restriction ignored.

Note that the NIT restriction on all four of the switches on the left side of switch board 152 in FIG. 7 is overly restrictive. It is possible in fact to ignore one of the four restrictions, and still prevent a deadlock cycle, as shown in FIG. 8. It can be seen that message $164_3$ is an outgoing message, and that once message $164_3$ clears the switch board, messages $164_1$, $164_4$ and $164_2$ can continue their route in order. This observation is the basis for the deadlock avoidance scheme, called pivoting, in accordance with an object of this invention.

Figure 11:
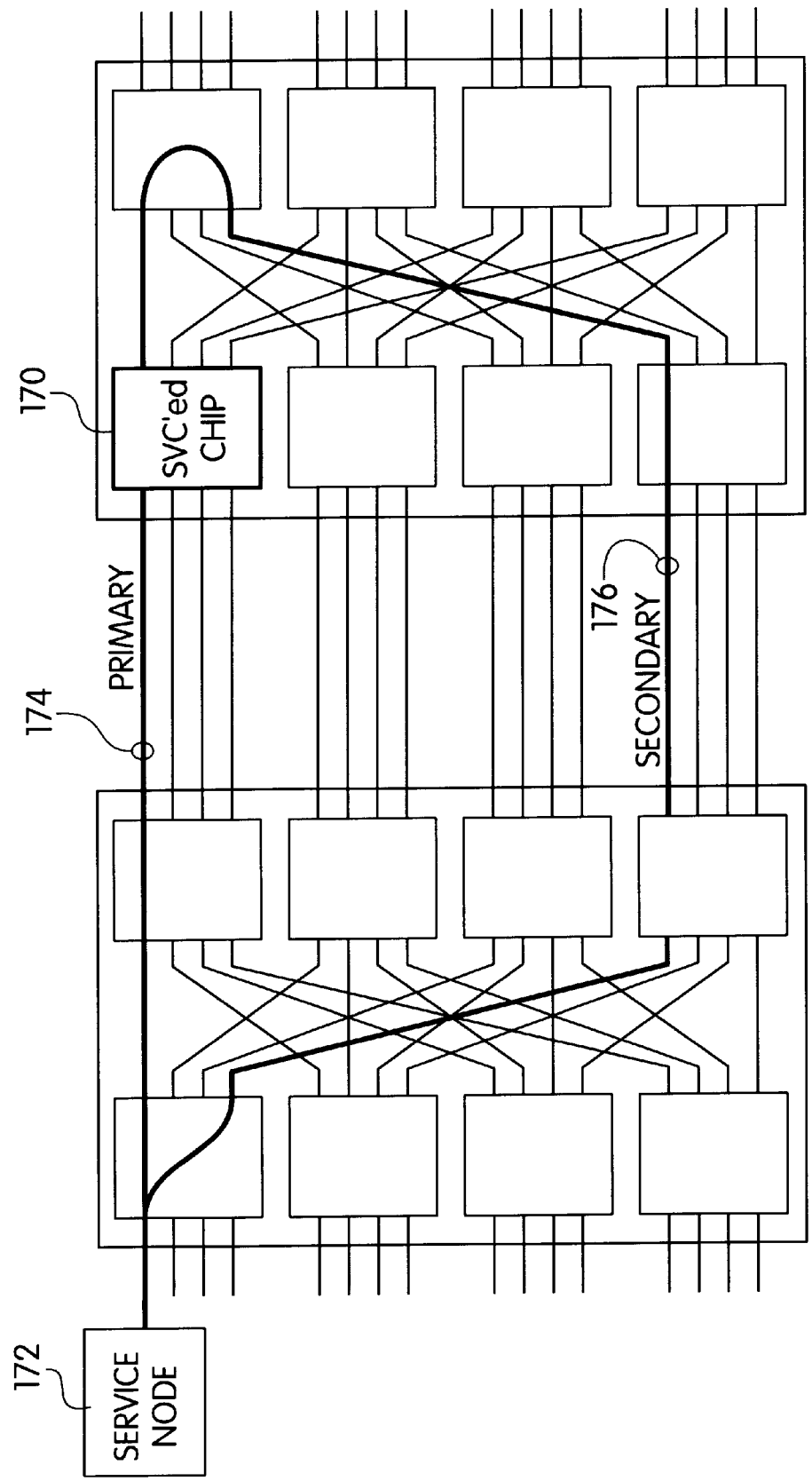
FIG. 11 is a schematic representation illustrating the minimum length routes which are taken by primary and secondary service messages between two switch boards.

Routing restrictions typically applied to data messages may also be applied to service messages. Service messages are commonly utilized as shown in FIG. 11, wherein a cross-point switch chip 170 requires service from a service node. A service message must therefore be routed from the service node 172 to the chip 170. Similar to routing data messages, the shortest and most direct path is also a goal for routing service messages. However, in accordance with an embodiment of the present invention, to improve reliability of the processing system, the service message is duplicated and routed as a primary service 174 message and a secondary service message 176. Moreover, to further enhance the reliability, a requirement is placed on the secondary service message 176 such that it must be routed disjointly from the matching primary service message 174. Messages are said to be routed disjointly when the route taken by each message does not share the same switches or links, with the obvious exceptions of the node, the first switch directly connected to the node and the serviced switch.

Although the disjointness requirement increases the overall reliability of the service processor system, it occasionally forces the secondary service message to make additional turns in the network that would not have been necessary if the requirement did not exist. It is a further objective of this invention to provide deadlock free routing notwithstanding the additional requirements placed on secondary service messages.

Figure 12:
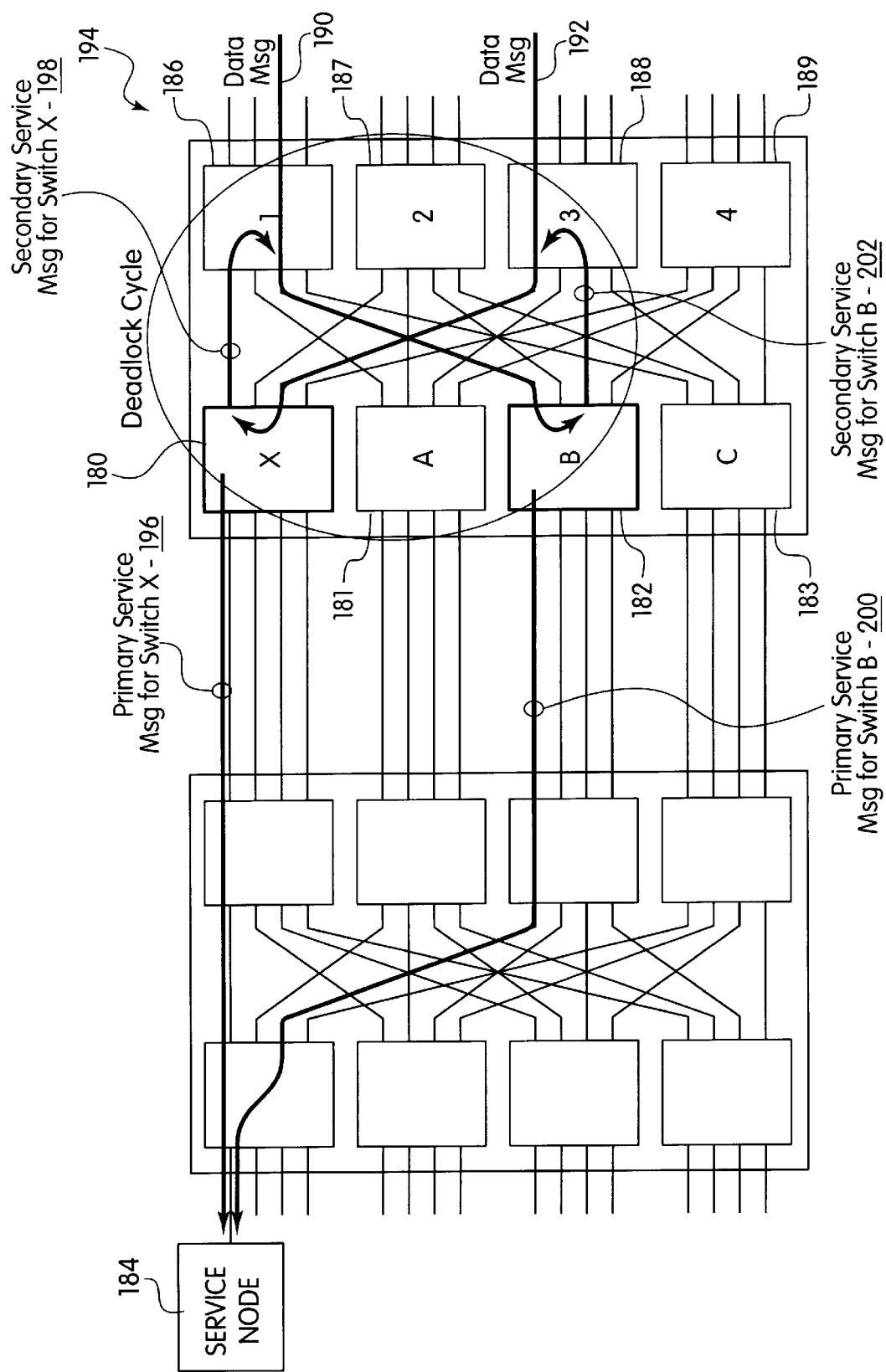
FIG. 12 is a schematic representation of two switch boards illustrating a deadlock cycle created by four messages.

FIG. 12 is an illustration of the deadlock cycles which may result in a node switch board from the additional traffic as a result of the disjoint routing requirement placed on secondary service messages. As shown, each of the switches 180 and 182 require service information from service node 184. Each switch therefore sends a primary and secondary service message to service node 184. Simultaneously, data messages 190 and 192 enter switch board 194 through switches 186 and 188, respectively. Due to the disjoint requirement, the secondary service message 198 from switch chip 180 needs to turn around from one of switches 186, 187, 188 and 189, in order to avoid the primary service message 196 route. Similarly, the secondary service message 202 from switch 182 needs to turn around from one of switches 186, 187, 188 and 189, to avoid the primary service message 200 route. In total, there are four switches, 180, 181, 182 and 183 that require their secondary message route to turn around from one of switches 186, 187, 188 and 189. Turning around from two or more of switches 186, 187, 188 and 189 leads to deadlock cycles in the node switch board 194. As illustrated in FIG. 12, data routes originating from the right side processors need to turn around from switches 180, 181, 182 and 183 in order to communicate with other processors on the right side. Note that internal turns within switches 186, 187, 188 and 189 will not achieve the data message's goal of communicating with other processors— the data message will return to the processor from which it originated. If secondary service message routes for switches 180, 181, 182 and 183 are required to turn around from switches 186, 187, 188 and 189, then deadlock cycles will be created in the network.

Initially, to solve the problem discussed with respect to FIG. 12, routing restrictions are placed on the node switch boards to prevent turning around from specific switches. Specifically, no-internal-turn restrictions are placed on the switches one stage of switches away from processors, and no-external-turn restrictions are placed on the switches two stages of switches away from the processors. These restrictions eliminate the node switch boards from contributing to deadlock cycles in the system. Advantageously, the restrictions do not adversely effect the data message routing because data message routes always take the shortest paths and the restricted turns do not alter the shortest paths between processors.

Figure 13:
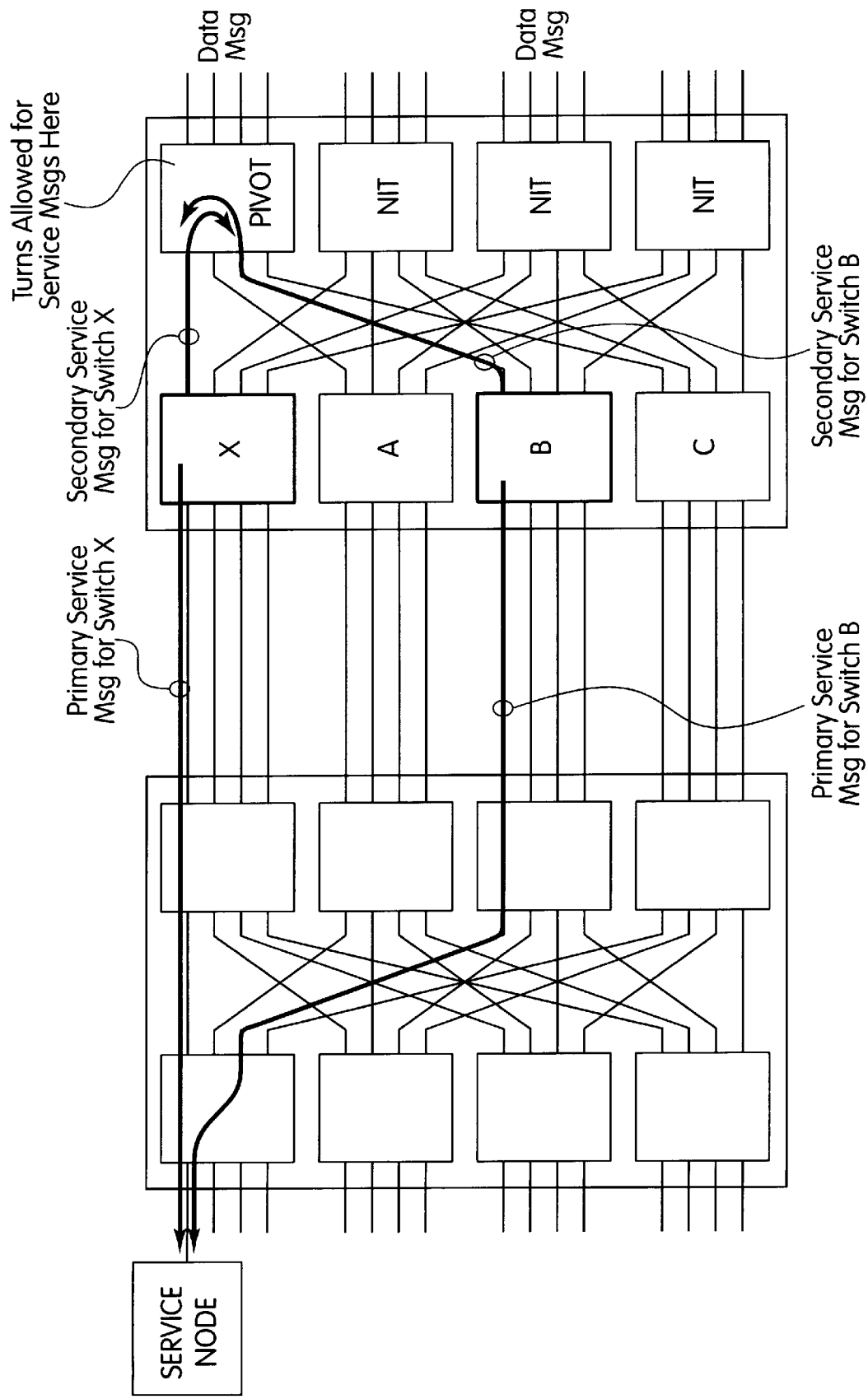
FIG. 13 is a schematic representation of two switch boards with routing rules and pivoting in accordance with the present invention.

However, an undesired result of placing NIT routing restrictions on node switch boards is that the secondary service messages are also prohibited from making an internal turn. Therefore, they may not be able to satisfy the disjoint routing requirement illustrated in FIG. 11. The secondary service message may need to make an internal turn to avoid the links and switches used in the primary service message route. Since a primary service message is required to take the shortest and most direct route, it may only use the link that exits from a switch and heads directly towards the service processor. Therefore, it is necessary for the secondary message to first head in a direction which is not directly towards the service processor, to avoid using a link or switch used by the primary service message and then turn around towards the processor. As shown in FIG. 13, this turnaround will be a violation of the NIT route restriction.

In accordance with the present invention, a solution to the problem encountered by the secondary service message routing is to designate at least one node switch board switch connected to a processor as a pivot switch chip where turning around is permitted. The pivot switch, therefore, does not have a NIT or NET restriction on it. The pivot switch allows secondary service messages to turn around from the pivot and therefore allows them to follow a route disjoint from that of the primary service message. Preferably, only one switch in the network is designated as a pivot switch, since having two or more pivot switches may create cycles as were illustrated in FIG. 12. Designating only one pivot switch does not lead to a cycle, as illustrated in FIG. 8. FIG. 13 illustrates a network having one switch marked as the pivot switch and other switches, at the same network level, marked with NIT restrictions, in order to avoid cycles.

Figure 14:
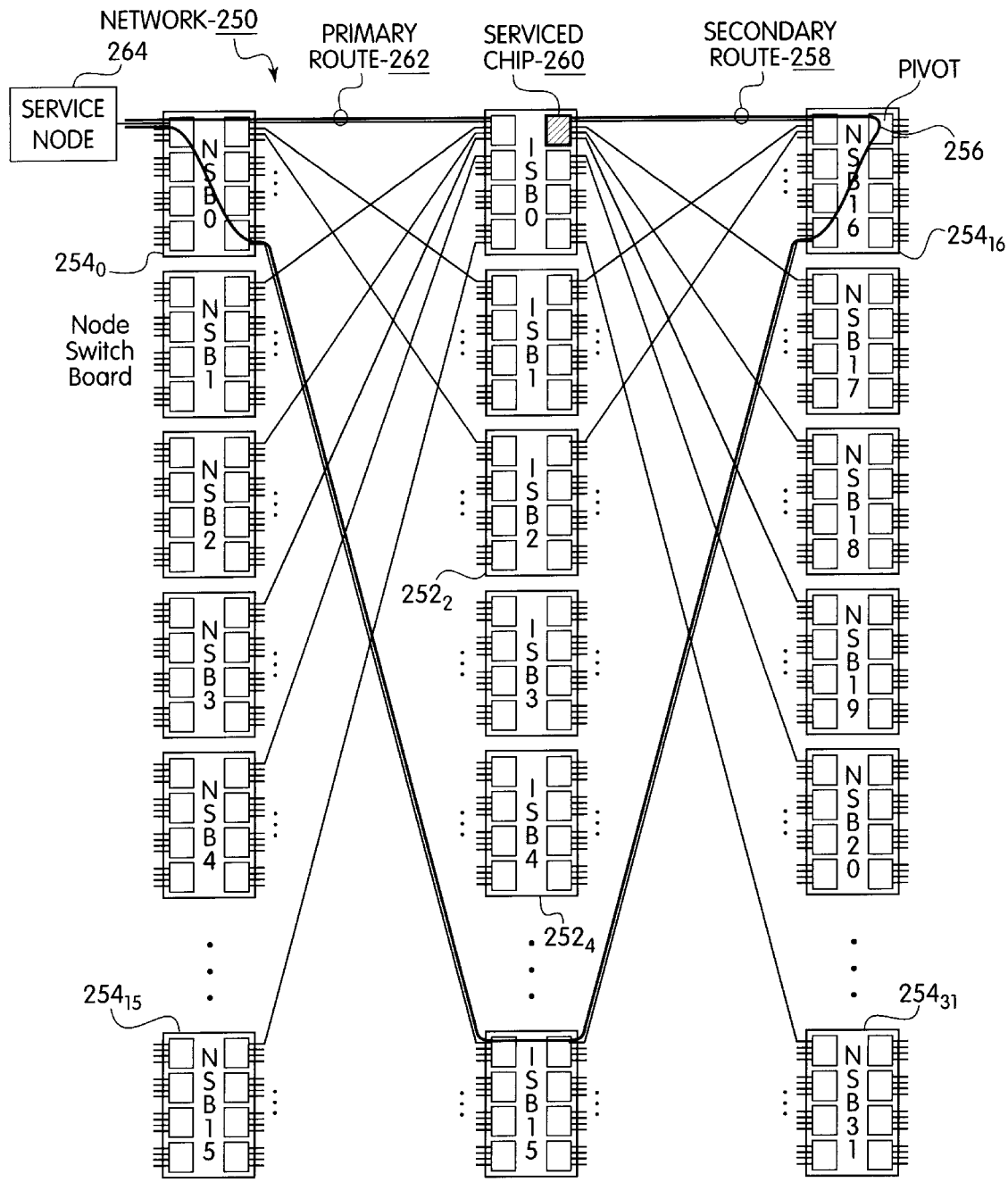
FIG. 14 is a schematic representation illustrating service message routing in a large network having a pivot switch.

FIG. 14 illustrates an example of a 512 processor network 250 having intermediate switch boards $252_0$–$252_{15}$ and node switch boards $254_0$–$254_{31}$ with one switch in node switch board $254_{16}$ designated as a pivot switch 256 from which secondary service messages 258 can turn. Serviced chip 260 is illustrated sending or receiving a pair of service messages 262 and 258 to or from service node 264. The primary service message 262 occupies the most direct route between service node 264 and the serviced chip 260. Although secondary service message 258 must traverse the same first switch board $254_0$ as did primary service message 262, to avoid occupying the same link, secondary service message 258 traversed intermediate switch board $252_{15}$ and turned around via pivot switch 256 to access the serviced chip 260. Therefore, primary service message 262 and secondary service message 258 follow disjoint routes, and in the event of a switch or link failure, at least one of the service messages will arrive at its destination.

In the examples given above, the pivot switch had no internal routing restrictions. In another embodiment of the present invention, and in different network topologies, the pivot switch restrictions may be implemented on a per port basis. For example, turning from pivot port 4 to 7 may be allowed, but turning from pivot port 4 to 6 may not be allowed, and so forth.

In many topologies, including the service processor topology, it is preferable to define the farthest switch away from the service processor and at the opposite end of the network as the pivot switch. This will allow more paths for the secondary service messages to access to avoid the corresponding primary service message route after turning around from the pivot switch. The distance is measured by the number of stages of switches the pivot switch is removed from the processor in the network.

In another embodiment of the present invention, the pivot switch chip may be identified to the routing software manually by the network administrator. In the IBM SP PSSP 2.1 release implementation, one way of manually identifying a pivot is by placing the declaration aux route-pivot<switch_id> statically in the topology file which describes how the processors and switches are interconnected.

However, it can be appreciated that a manual selection of the pivot switch may cause logistical difficulties in the field. There are thousands of service processor installations in existence with many different topology files. Updating each of the topology files with the manual pivot switch declarations would be a difficult task. Furthermore, the manually selected pivot switch may become unavailable. For example, the switch board that contains the pivot may be powered off due to maintenance. Hence, since manual designation of pivot switches may not always provide for disjoint secondary message routes, reliability of the system will be sacrificed.

The problems associated with the manual pivot switch selection are solved by a method in accordance with the present invention called auto-pivoting, wherein the pivot switch is defined dynamically by routing software which accesses the actual network topology and, thereby, takes powered-off switches and such into consideration. Thus, the auto-pivoting method eliminates the need for an aux routepivot declaration and will eliminate inherent problems associated with manual pivot switch selection.

The auto-pivoting method includes a method for finding the farthest switch away from the service processor. For the network topologies used in service processor systems and many other bidirectional multistage networks, the auto-pivoting method can be described as follows. The auto-pivoting method starts with the service processor and then proceeds to the switch S connected to the service processor. Then, the method advances to consecutive stages of switches in the network, without proceeding to the same switch more than once. The search is performed such that the method always goes forward in the network and makes no turns. For example, if the method arrived at a switch through one of ports 0–3, then it must exit the switch through one of ports 4–7 toward the next stage. Likewise if the method arrived at a switch through one of ports 4–7, then it must exit the switch through one of ports 0–3 toward the next stage of switches. By always going forward in the network, the method will eventually arrive at a processor. The switch connected to the processor is designated as the pivot switch.

The following method is preferably employed to determine the primary and secondary service message routes between a switch X to be serviced and a service processor S, in accordance with the present invention.

1—Determine a shortest route from X to S for the primary service message while observing all routing restrictions, e.g., NIT and NET.

2—Mark any switches used in the primary message route as "DO-NOT-USE", except for the first switch (X) and the last switch (the switch that is connected to the service processor).

3—Find a shortest path from X to S for the secondary service message while avoiding DO-NOT-USE switches, and while observing all of the NIT and NET routing restrictions, and using the pivot switch if necessary.

4—If no secondary service message route, which satisfies the disjoint routing restriction, is found in Step 3, then change the status of the DO-NOT-USE switches to MAY-BE-USED. Otherwise, if a secondary service message route is found, proceed to step 6.

5—Find a shortest path from X to S for the secondary service message route, while observing all of the NIT and NET routing restrictions, and using the pivot switch if necessary. Switches marked as MAY-BE-USED may be used, but avoid them whenever possible to minimize the number of switches traversed by both the primary and secondary service message routes.

6—Write the primary and secondary service message routes to the routing table. End of method.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. In an apparatus having a network comprised of successive stages of cross-point switches which collectively interconnect a plurality of nodes external to said network, wherein at least one service message is carried between one of said nodes and one of said cross-point switches over a route through said network, a method for substantially preventing routing deadlocks from occurring in the network and reliably routing service messages, said method comprising the steps of:

defining a plurality of routes through said network such that at least one service message can be carried from individual nodes within said plurality of nodes over different corresponding ones of said routes to every cross-point switch within said network, wherein each of said defined routes extends over at least one link;

duplicating said at least one service message to be routed through said network; and imposing routing restrictions on at least one of said cross-point switches in said network, wherein said restrictions include at least one of a no-internal-turn restriction and no-external-turn restriction place on at least one of said cross-point switches.

2. The method as recited in claim 1, further comprising the step of placing said no-internal-turn routing restriction on said at least one of said cross-point switches within a stage of cross-point switches which is one stage removed from one of said plurality of nodes external to said network.

3. The method as recited in claim 1, further comprising the step of placing said no-external-turn routing restriction on said at least one of said cross-point switches within a stage of cross-point switches which is two stages removed from one of said plurality of nodes external to said network.

4. The method as recited in claim 1, wherein the cross-point switches which are directly connected to said plurality of nodes external to said network are defined as node switch board switches and at least one of said node switch board switches is defined as a pivot switch.

5. The method as recited in claim 4, wherein said at least one of said node switch board switches defined as a pivot switch is a node switch board switch located a greatest number of stages removed from said plurality of nodes external to said network.

6. The method as recited in claim 4, wherein said node switch board switches include a plurality of input and output ports, at least one of said routing restrictions being limited to at least one of said plurality of input and output ports.

7. The method as recited in claim 4, further comprising the step of manually defining at least one of said node switch board switches as said pivot switch by a network administrator.

8. The method as recited in claim 4, further comprising the step of automatically defining at least one of said node switch board switches as said pivot switch.

9. The method as recited in claim 8, wherein said step of automatically defining at least one of said node switch board switches as said pivot switch includes a means for defining a node switch board switch located the greatest number of stages away from a service processor as the pivot switch.

10. The method as recited in claim 1 wherein said apparatus is a parallel processing system and each of said nodes comprises a separate processing element.

11. The method as recited in claim 10, wherein said parallel processing system comprises 512 separate processing elements and said switches are organized into 32-port switch boards and said parallel processing system further comprises a plurality of said switch boards wherein 32 of said switch boards are node switch boards and 16 of said switch boards are intermediate switch boards, with said intermediate switch boards collectively inter-connecting all of said node switch boards such that a corresponding one of 16 ports on each of said node switch boards is connected, through a different corresponding link, to a same corresponding port on each one of said node switch boards and the remaining 16 ports on each of the node switch boards are connected to 16 different successive ones of said processing elements.

12. In an apparatus having a network comprised of successive stages of cross-point switches which collectively interconnect a plurality of nodes external to said network, wherein at least one service message is carried between one of said nodes and one of said cross-point switches over one of a plurality of routes through said network, wherein said at least one service message comprises a primary service message and a secondary service message, a method for substantially pre venting routing deadlocks from occurring within the network, said method comprising the steps of:

defining said plurality of routes through said network such that a packet can be carried from individual nodes within said plurality of nodes over different corresponding ones of said routes to each of said cross-point switches within the network, wherein each of said defined routes extends over at least one link;

determining a first route traversing a minimum number of links and cross-point switches between one of said cross-point switches, requiring a service, and a corresponding service processor;

marking all switches traversed by said first route with a do-not-use message;

determining a second route traversing a minimum number of links and cross-point switches, between said cross-point switches requiring service and said corresponding service processor, which does not traverse any of said switches marked with said do-not-use message; and writing said first and second routes to a routing table.

13. The method as recited in claim 12, wherein the step of determining said first route further includes observing all routing restrictions.

14. The method as recited in claim 12, further comprising the step of changing said -do-not-use message to a may-be-used message if said second route can not be determined without traversing any of said switches marked with said do-not-use message.

15. The method as recited in claim 12, wherein the step of determining said second route further includes observing all routing restrictions.

16. The method as recited in claim 12, wherein the step of determining said second route further includes pivot switch.

17. The method as recited in claim 12, wherein said first route is traversed by said primary service message.

18. The method as recited in claim 12, wherein said second route is traversed by said secondary service message.

19. The method as recited in claim 12, wherein said step of determining a second route includes a restriction that said second route must be disjoint from said first route with an exception of a first switch and a last switch which may be common to said first and second routes.

* * * * *